(No Model.)
G. LEVERICH.
HORIZONTAL DEFLECTING PULLEY FOR CABLE RAILWAYS.
No. 428,216. Patented May 20, 1890.
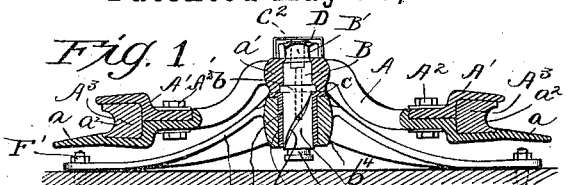
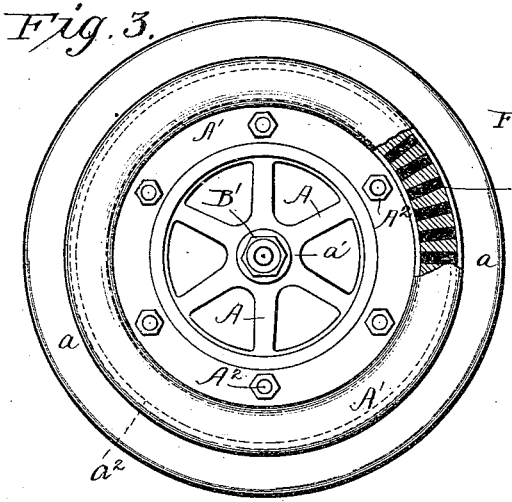
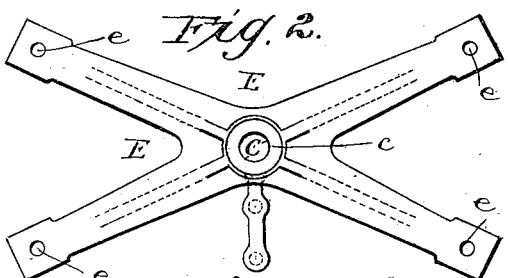
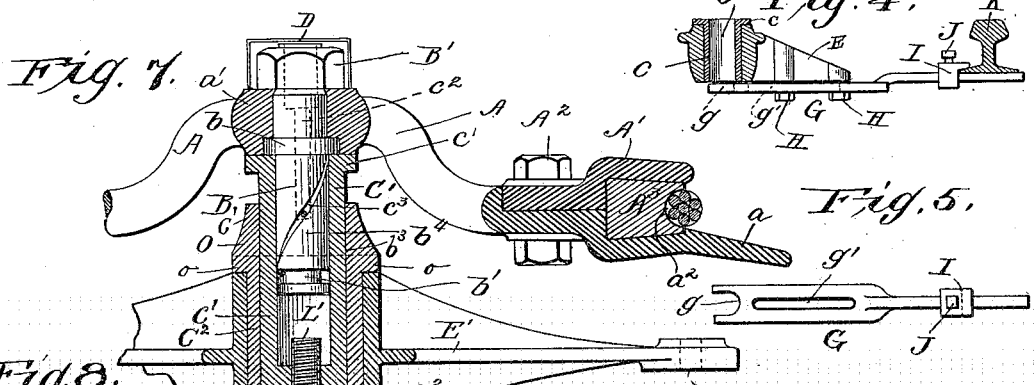
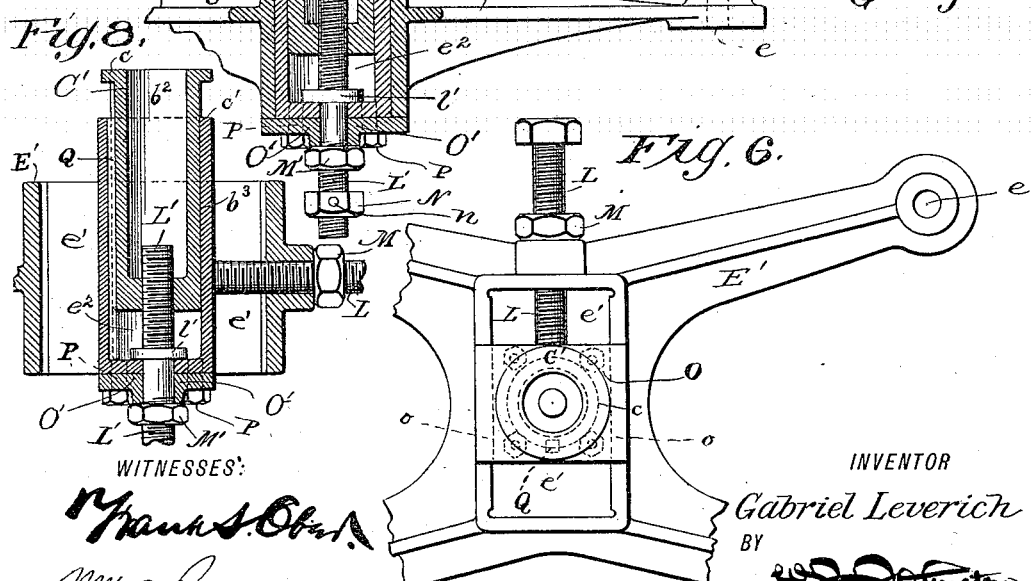
WITNESSES:
INVENTOR
Gabriel Leverich
BY
ATTORNEY.

UNITED STATES PATENT OFFICE.

GABRIEL LEVERICH, OF SOUTH ORANGE, NEW JERSEY.

HORIZONTAL DEFLECTING-PULLEY FOR CABLE RAILWAYS.

SPECIFICATION forming part of Letters Patent No. 428,216, dated May 20, 1890.

Application filed January 18, 1890. Serial No. 337,356. (No model.)

*To all whom it may concern:*

Be it known that I, GABRIEL LEVERICH, a citizen of the United States, residing in South Orange, in the county of Essex and State of New Jersey, have invented certain new and useful Improvements in Horizontal Deflecting-Pulleys for Cable Railways, of which the following is a specification.

On railways where the cars are hauled by cable and there are horizontal curves on the track it is necessary, in leading the cable around the curves, to support it on grooved pulleys placed quite close together between the rails. Pereferably for this purpose the pulley should be so constructed that it may be readily removed when worn or broken; its grooves should be packed with leather and india-rubber or similar material to prevent undue wear of the cable, and its journal should be in the plane of stress and easily lubricated; also, in some cases the pulley-frame should be capable of adjustment to retain the cable in line between the rails as the packing wears, or possibly the frame is displaced. These desirable features are embodied in this improvement as set forth in the following specification, and shown in the accompanying drawings, in which—

Figure 1 represents a longitudinal sectional elevation of a pulley and non-adjustable frame; Fig. 2, a plan of a non-adjustable frame; Fig. 3, a plan of a pulley, a portion of the rim being broken out to show the separate pieces of packing; Figs. 4 and 5, an elevation and plan of a latch; and Figs. 6, 7, and 8, respectively, a plan, longitudinal, and transverse sectional elevation of an adjustable frame.

The arms of the pulley A curve downward from the hub $a'$ to the rim, which is the lower fixed half of the flange having an exterior annular lip $a$. The upper half of the flange A is removable, and is fastened to the rim by the bolts $A^2$. Together these parts form a dovetailed circular groove to receive the packing $A^3$, against which the cable in the circular groove $a^2$ bears. This packing is composed of suitable material, preferably of pieces of leather and sheet india-rubber cut to fit closely into the dovetailed groove and laid compactly therein, radial to the rim and alternating regularly in any desired proportion, whether of one, two, three, or more pieces of leather to one of india-rubber, the flange $A'$ being first raised slightly for the purpose and afterward drawn down by the bolts tight against the packing, thus clamping it securely in position.

Projecting downward from the hub $a'$ and fixed therein by the collar $b$ and the nut $B'$ is the spindle B, the lower part of which forms the journal $b^4$ of the pulley, one half of the bearing being above and the other half below the plane of the cable-groove $a^2$. The pulley may run in any suitable frame. Preferably it should be of an elongated cruciform shape, Figs. 1, 2, 6, and 7, with the arms extending out and downward from a central boss or box to allow free space for the pulley, and fastened in position to the ties between the rails by the hanger-bolts F and nuts $F'$ through holes $e$, or in other similar manner. Two styles of frames are shown E E'. Each has a detachable journal-bearing of brass or like material, consisting of a cylindrical bush C or C', with an annular lip or collar $c$ or $c'$ on the upper end, on which the pulley-hub rests.

Central in the frame E', which carries adjustable pulley-bearings, is a vertical rectangular chamber $e'$, placed with its longer center line normal to the rails, and in this chamber is the square journal-box O. This box is kept from moving vertically at the top by the fixed flange $o$ and at the bottom by the cap O', which is fastened by the tap-bolts P. It is free to move laterally within the chamber, except as prevented in the direction toward the center of the track-curve by the side adjusting-screw L, which passes through the frame at the end of the chamber and is locked by the nut M.

Within a vertical cylindrical chamber $e^2$ in the journal-box is the cylindrical bush C', already described, in which the pulley-journal runs. It is prevented from rotating by the square feather Q, let one half into a longitudinal groove along the outer surface of the bush and one half into a corresponding groove along the inner surface of the journal-box. It may be moved up or down therein by the end adjusting-screw L', which passes through the center of the cap O' and the bottom of the journal-box, and is there held by the collar $l'$ and the lock-nut $M'$. It is threaded into the bottom of the bush $C'$, and is turned by a wrench to be put on the nut $N$, which is fastened on the screw by a pin $n$.

To lubricate the pulley-bearing easily and constantly, there is on the spindle and in its axis an oil-chamber $c^2$, reaching down from the upper and accessible end to below the central diameter of the journal, when it meets a small transverse passage to conduct the oil to the bearing on two opposite sides; also, at each extremity of this passage to distribute the lubricant there is a steep spiral groove $c^3$ on the surface of and nearly as long as the journal. The outward opening of the oil-chamber is covered by the sheet-metal cap $D$, which incloses and slightly clamps the nut $B'$, and is thereby kept in place unless removed by an attendant.

To prevent the pulley when in use from rising out of the frame and the journal from leaving its bearing $b^2$ in certain cases where such may occur, for the non-adjustable frame and underneath it is placed a latch $G$, which extends from the center of the frame to and under the outer rail $K$, and by means of the tap-bolts $H$ and the slot $g'$ is kept in position. It however may be moved a small distance laterally. At its inner end is a yoke $g$, fitted to enter into one half of a circular groove $b'$ around and at the lower projecting end of the spindle $B$, thereby when so entered locking the pulley-journal in its bearing.

To prevent unlocking, except when the pulley is to be removed, there slides along the outer end of the latch a keeper $I$, which by a projecting lip, as shown, rests on and against the inner flange of the rail and is clamped fast to the latch by a set-screw $J$.

As before stated, the hub $a'$ is fixed upon the upper end of the spindle $B$, the lower part of which forms the journal of the pulley and the central portion of which is in the horizontal plane of the cable-groove $a^2$. To bring said groove into the plane of said central portion, the arms of the pulley are curved downward from the hub to the rim, as shown, the object and advantage of which are that the groove is thus brought into such plane that no torsional strain will be brought against the bearing by the said stress of the cable.

I am aware of a somewhat similar construction of pulley, used as a driving-wheel, in which the bearings are supported or braced by a central shaft or spindle extending above and below the pulley and having bearings at such points; but, as is obvious, such construction could not be used as a cable-deflecting pulley, owing to the presence of the necessary upper bearing for the spindle.

Having thus described my invention, I claim—

1. A horizontal guide-pulley for cables, having its rim and hub in different planes and provided with an extended axle or shaft, in combination with a supporting-frame for the pulley provided with a vertically-adjustable bearing for the pulley-axle, the said bearing being in a plane with the rim of the pulley, and the said frame being supported solely from below the pulley.

2. The combination, with the bearing, of the pulley-axle having annular grooves $b'$, and the sliding latch $G$, having yoke $g$ at one end and carrying at its other end the adjustable keeper $I$, having set-screw $J$, substantially as described.

3. In combination with the laterally-adjustable box, a vertically-adjustable bearing therein, and a horizontal guide-pulley having its vertical axle extending from one side into said bearing.

In witness whereof I have hereunto signed my name in the presence of two subscribing witnesses.

GABRIEL LEVERICH.

Witnesses;
  WM. A. ROSENBAUM,
  THOMAS K. TRENCHARD.